(12) United States Patent
Thomassen

(10) Patent No.: US 6,284,208 B1
(45) Date of Patent: *Sep. 4, 2001

(54) METHOD FOR REMOVING MERCURY AND SULFUR DIOXIDE FROM GASES

(76) Inventor: Thomas Thomassen, N-4780, Brekkesto (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,855

(22) Filed: Apr. 14, 1999

Related U.S. Application Data

(63) Continuation-in-part of application No. PCT/NO97/00274, filed on Oct. 10, 1997.

(30) Foreign Application Priority Data

Oct. 15, 1996 (NO) ..................................................... 964384
Jan. 24, 1997 (NO) ..................................................... 970306

(51) Int. Cl.$^7$ ............................. B01D 53/50; B01D 53/64
(52) U.S. Cl. ................. 423/210; 423/243.1; 423/243.08; 423/243.11; 423/244.07; 423/244.08
(58) Field of Search .............................. 423/210, 243.08, 423/244.07, 244.08, 243.1, 243.11

(56) References Cited

U.S. PATENT DOCUMENTS

| | | | |
|---|---|---|---|
| 2,718,453 | * | 9/1955 | Beckman ........................ 423/244.08 |
| 3,524,720 | * | 8/1970 | Bauer ............................. 423/244.08 |
| 3,849,267 | | 11/1974 | Hilgen et al. ......................... 204/99 |
| 3,969,479 | * | 7/1976 | Lonnes et al. ........................ 423/210 |
| 4,115,518 | * | 9/1978 | Delmon et al. ....................... 423/244 |
| 4,233,274 | * | 11/1980 | Allgulin ............................. 423/210 |
| 4,274,842 | | 6/1981 | Lindau .................................... 55/72 |
| 4,443,417 | * | 4/1984 | Wiklund ............................. 423/210 |
| 5,435,980 | | 7/1995 | Felsvang et al. ..................... 423/210 |
| 5,900,042 | | 5/1999 | Mendelsohn et al. ................. 75/742 |

FOREIGN PATENT DOCUMENTS

| | | | |
|---|---|---|---|
| 0706815A2 | | 4/1996 | (DE) .............................. B01D/53/64 |
| 54-110966 | * | 8/1979 | (JP) ..................................... 423/210 |
| 64-70130 | * | 3/1989 | (JP) ..................................... 423/210 |
| WO 98/16301 | * | 4/1998 | (WO) . |

* cited by examiner

*Primary Examiner*—Steven P. Griffin
*Assistant Examiner*—Timothy C. Vanoy
(74) *Attorney, Agent, or Firm*—Ladas & Parry

(57) ABSTRACT

A process is provided for the removal of mercury and sulfur dioxide out a flue gas from, for example, power stations, smelters, waste incineration plants and crematories, by washing the flue gas with an oxidized, chloride-containing washing water, which may be sea water, which has been oxidized by either adding an oxidizing agent, such as sodium hypochlorite, or by passing an electric current through the washing water (which converts the chloride values into chlorine) so that the gaseous mercury is sorbed into the washing water and is converted into mercury (II) chloride complexes and the gaseous sulfur dioxide is sorbed into the washing water and converted into sulfuric acid, and subsequently passing the resulting mercury (II) chloride and sulfuric acid-containing washing water and the flue gas through a bed of calcium carbonate where the sulfuric acid and the calcium carbonate react to form calcium sulfate which is washed off the bed into the washing water. The calcium sulfate and mercury(II) chloride-containing washing water is collected in a sump and the cleaned flue gas is discarged from the process.

4 Claims, 1 Drawing Sheet

METHOD FOR REMOVING MERCURY AND SULFUR DIOXIDE FROM GASES

This application is a continuation-in-part of PCT/NO97/00274 filed Oct. 10, 1997.

The present invention refers to an improved process and device for the removal of mercury and sulphur dioxide from flue gases from, for example, smelters, power stations, waste incineration plants, and crematories, by washing the gas with chloride containing water, such as sea water, to which is added an oxidizing agent which oxidizes all of the mercury to Hg(II) ions, and by using such high redox value in the washing water that $Hg^+$ salts cannot precipitate. The gas and the washing water are passed co-currently down through a bed of consumable limestone. The mercury(II) ions will then dissolve easily in the chloride containing washing water, as a chloride complex, and the oxidized sulphur oxide is converted to sulphuric acid being neutralized by the consumable limestone, such that the pH value of the washing water remains almost constant without the need for using an aqueous solution of sodium hydroxide as a neutralizing agent. Further, the bed of limestone will be functioning as a turbulent mixer of gas and washing water for a rapid oxidation, and since the limestone is slowly consumed, deposits such as gypsum and dust will continuously be washed away from the limestone gravels without clogging the bed.

The present process is carried out by adding to the gas washing water containing 30–40 g chlorides/liter, an oxidizing agent, such as sodium hypochlorite, until the redox potential of the water is within the range 600–800 mV. The gas washing water and the flue gas are fed co-currently down through the lime stone bed, in which they are mixed intimately for a rapid reaction and absorption of the mercury in the aqueous phase.

As flue gases also often contain $SO_2$ gases, sulphuric acid is formed by the oxidation which reduces the pH value of the gas washing liquid.

According to the present invention, the gas is passed co-currently with the gas washing water through the bed of, for example, limestone. The limestone will neutralize the acid(s), and hence the pH of the gas washing water will remain nearly constant in the range 5–6 pH units, and thus completely eliminate the need for the use of aqueous sodium hydroxide, as well as the possibility of $SO_2$ reducing the oxidized mercury to $Hg^+$ salts which can precipitate, or to metallic Hg which is reintroduced into the flue gas.

The bed of consumable limestone is constantly washed with the gas washing liquid, so that dust and formed sulfates, such as gypsum and other particles, are continuously washed into a collection tank arranged below the gas washing tower, from which the washing water is conducted to an adjacent water purification plant in which the mercury is removed as sulfide by common precipitation.

Gypsum particles and other particles act as an in situ filter aid for the minute precipitated mercury sulphide particles in the water purification plant, thus easing the separation of slime and water, for instance by filtration, and the chloride water, which will be practically devoid of mercury (<1 µg Hg/l), can either be disposed to a recipient or returned to the gas washer.

In addition, it is preferred to conduct the gas and the gas washing water co-currently down through the bed of limestone and into the collection tank for the gas washing water, in which tank the gas washing water and the gas phase meet the surface of the water in the tank. The water droplets in the gas phase will then be absorbed on the water surface by adjusting the distance between the bed of limestone and the water surface in the collection tank for the gas washing water as well as the length of said surface, before purified gas is exhausted to a chimney. This will eliminate the need for complicated droplet-catchers, being in common use in counter current gas washing.

It is known that the mercury in the flue gases exists both as oxidized mercury and metallic mercury vapour. The metallic mercury vapour is the most difficult to remove with wet washing of the flue gas, as the vapour must be oxidized before it can be absorbed in the gas washing water.

Flue gases from smelters and power stations have a relatively even content of mercury and other gases, such as $SO_2$, which reduces the mercury to metallic vapour in the flue gas, which can contain from 10–20 µg $Hg/Nm^3$ up to 300–500 µg $Hg/Nm^3$.

The smoke gases from waste incineration plants and crematories show large variations in the consentration of mercury. The consentrations can be 100–10.000 µg/$Nm^3$ gas over a short period of time, 5–10 minutes, due to sources containing large amounts of mercury, such as dental amalgam.

A wet wash process for effective removal of mercury hence must have very quick reaction kinetics to be able to handle these relatively short and intense peaks of mercury in the flue gases.

In accordance with the invention, it is preferred to add sodium hypochlorite to a gas washing water based on sea water, such that the redox potential of the sea water remains in the range 600–800 mV, and subsequently feed the gas and the gas washing water down through a bed of limestone, such that the pH in the gas washing water stays between 4 and 6 pH units, and subsequently into a tank in which particles and the gas washing water are collected, whereafter the gas washing water is purified in an adjacent water purification plant, and one part of the purified water is returned to the gas scrubber and one part is led to a recipient. This process removed 90–93% of the mercury from the flue gas from a smelter at a residence time in the gas scrubber of only 0.05–0.10 seconds.

The purified flue gas contains 11–16 µg $Hg/Nm^3$ after purification.

The present invention is a simplification and improvement of known methods, which is in demand with the increasing concern about mercury pollution, in particular from waste incineration plants and crematories, but also from smelters and power stations.

Oxidation of mercury with absorption in a chloride containing gas scrubber water has been described in numerous publications and patents, inter alia U.S. Pat. No. 5,009,871.

U.S. Pat. No. 5,009,871 teaches that reducing gases such as $SO_2$ gas reduces oxidized Hg to metallic Hg, which leaves the gas washing water and is reintroduced into the flue gases. In order to prevent this, U.S. Pat. No. 5,009,871 teaches that the redox in the gas washing water must be >300 mV, and preferably in the range 530–710 mV for approximately 80% reduction of the Hg contents in the flue gases.

Further, U.S. Pat. No. 5,009,871 teaches that due to hydrochloric acid and other reducing gases in the flue gas from incinerators, the addition of, for example, NaOH to the gas washing water is necessary in order to give a pH of 8.

It has surprisingly been found that the teaching of U.S. Pat. No. 5,009,871 concerning the addition of caustic (NaOH) to increase the pH to approximately 8 in the gas washing water is not necessary when the gas washing water an the gas is led co-currently down through a bed of limestone.

A person of ordinary skill in the art will know that at pH values of 8 in the gas washing water, carbonates are formed when $CO_2$ is present in the gases. The produced carbonate can easily be deposited on the surface of the gas scrubber, in valves, tubes, and in tanks, and hence a pH of 8 in the gas washing water may be undesirable when the gas contains $CO_2$ gas.

Carbonate formation decreases at pH values of <6 in the gas washing water and is completely eliminated at pH <4.

In accordance with the present invention, the pH in the gas washing water consisting of sea water is always in the range 5–6 units, and no formation of carbonates was observed, whereas it was observed when NaOH was used at pH values of 8.

This could in no way be deduced from U.S. Pat. No, 5,009,871, which describes an apparatus which bubbles a gas through an aqueous solution at the rate of 1 l/min (column 8, lines 1–10).

U.S. Pat. No. 3,849,267 teaches that if chlorine gas is added to a gas containing mercury before the gas mixture is fed to beds consisting of, respectively, a 30 cm thick bed of 2 inch saddle formed fillings of a ceramic material, then through a 25 cm thick bed of 1 inch saddle formed fillings, then a 5 cm bed of glass wool of 4 $\mu$m fibres, and finally through a 50 cm thick bed of granulated active carbon (column 4, example 5), 20–30 mg $Hg/M^3$ to 0.02 mg $Hg/m^3$ (=20 $\mu$g $Hg/m^3$) of mercury will be removed from the gas.

The present invention needs only a bed on limestone, and no bed of active carbon is necessary to obtain an exhaust gas containing 10–15 $\mu$g $Hg/m^3$, something which cannot be deduced from U.S. Pat. No. 3,849,267, as the examples 1–4 of U.S. Pat. No. 3,849,267 teach that without active carbon, the contents of mercury in the purified gas is 100, 50, 100–200 and 80 $\mu$g $Hg/m^3$, respectively.

Further, U.S. Pat. No. 3,849,267 teaches that mercury is deposited on the solid bodies in the gas scrubber (claim 1), and it is mentioned that the deposits are in the form of $Hg_2Cl_2$ (column 1, lines 46–51, and column 5, lines 5–14).

This is contrary to the teaching of the present invention, in which it is mandatory that all mercury is continuously oxidized to $Hg^{++}$ and absorbed in the washing water, and is not deposited in the limestone bed.

Norwegian patent No. 148 962 refers to a method in which mercury is removed from a flue gas containing significant amounts of $SO_2$ after rosting of sulfide ores, in order to produce a sulphuric acid with a low content of mercury.

Removal of mercury from the gas takes place by using a washing solution containing 0,02–20 g $Hg^{++}$/liter.

This washing solution oxidizes the metallic mercury in the gas to $Hg_2Cl_2$, which is subsequently removed in an adjacent plant.

On page 7, lines 14–16, it is mentioned that if the contents of mercury(II) ions in the solution (=washing solution) becomes too low, the mercury can no longer be taken up by the solution. On the same side, line 19, it is mentioned that said mercury contents preferably should be between 10 and 50 mmol/l (=2–10 g Hg/l).

In accordance with the invention, no $Hg_2Cl_2$ is produced, as all the mercury in the flue gas is oxidized to $Hg^{++}$ ions and is absorbed by the washing water as a chloride complex. This implies that the washing water in accordance with the invention in reality does not necessarily have to contain mercury, even if in practice the contents will be 1–5 mg/1 $Hg^{++}$ ions, or approximately 1/1000 of what is stated in NO 148,962, and even then 90–93% of the mercury, in accordance with the present invention, will be removed with a residence time in the gas scrubber of only 0.05–0.10 seconds.

At the same time all $SO_2$ is removed, which is not the case for NO 148,962, operating with an acid washing solution.

Norwegian patent NO 154,682 refers to a process for the purification of gases for metallic mercury by precipitation of $Hg_2Cl_2$ with a washing water containing 0.02–60 g $Hg^{++}$/liter. The essential part pf NO 154,682 is that the gas is moistened to saturation at 60–70° C. and then quench the washing water sufficiently to cool the gas to a temperature at which the vapour in the gas condenses and thereby removes mercury containing liquid (claim 1).

In accordance with the invention, there is no need for such cooling of the gas as taught by NO 154,682, as the gas and the washing water is sent co-currently through the bed of limestone and is impinging upon the surface of the washing water in the tank for washing water, where the descending washing water and water droplets in the gas phase are absorbed. This is a preferred embodiment of the present invention.

The method of the present invention operates according to a principle contrary to the teachings of NO 154,682, which operates according to the counter-current principle, in which the washing water decends and the gas ascends. As known to the person skilled in the art, the counter-current principle produces particles in the gas, and hence cooling of the gas or an efficient droplet catcher is essential when the washing water contains up to 2–10 g mercury/liter.

EP 0 709 126 A1 discloses a method and a device for the continuous removal and precipitation of mercury from gases. The washing solution in accordance with example 2 contains 8 g Hg(II)/l, 13 g/l $SCN^-$, 10 g/l sulphuric acid and 2 g/l active carbon. $H_2S$ gas is added to the gas to be purified, which is not necessary according to the present invention.

The device used in EP 0 709 126 A1 is a counter-current scrubber with a droplet catcher after the reactor, which in turn is filled with "filler bodies", which must be understood as being inert (=insoluble) towards the solution and gas flowing through the reactor.

In accordance with the present invention, both mercury, in the form of a Hg(II) complex, and the $SO_2$ gas in the flue gas, in the form of sulphuric acid, are washed away by using sea water to which an oxidizing agent is added, then the gas and the washing water are passed counter-currently down through a bed of consumable carbonates in which the sulphuric acid is neutralized, and the washing water with the absorbed mercury, as well as solid particles, pass through the carbonate bed and into the tank for washing water beneath the carbonate bed, then impinging upon the surface of the washing water, and thus the water droplets in the gas phase are absorbed without the need for a subsequent droplet catcher. This is the preferred mode and device for carrying out the present invention.

The invention represents a greatly simplified process and device for removing mercury and $SO_2$ from flue gases, and we are of the opinion that this combination of method and device for carrying out the method cannot be deduced from the above mentioned patents/applications or literature and other publicly accessible publications known to the applicant.

Another method for carrying out the invention, instead of adding sodium hypochlorite to the gas washing water, is to pass an electric current through the chloride containing sea water. This produces chlorine gas, which keeps the redox potential at the desired level. Other oxidizing agents can also be used, such as peroxides and persulphates.

It is also within the scope of the present invention to utilize other carbonates than limestone (calcite), such as dolomite, chalk, shell sand, and magnesite.

It is a requirement that the carbonate medium has a low solubility in hot water, such as limestone (calcite) with a solubility of approximately 0.02 g/l water, og magnesium carbonate (magnesite) with a solubility of approximately 0.1 g/l, whereas dolomite has a solubility of approximately 0.32 g/l hot water.

Figure 1:
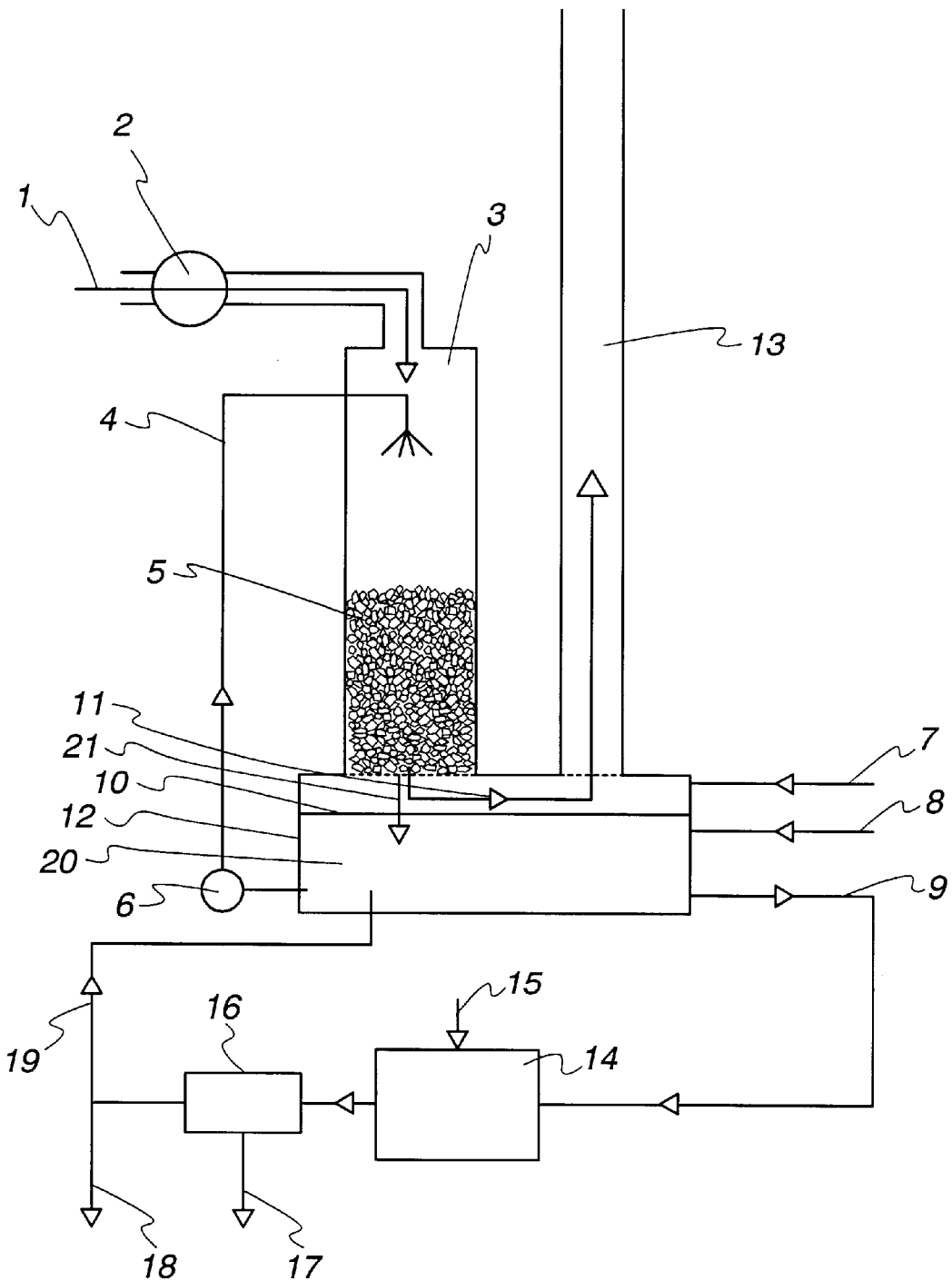
FIG. 1 shows a schematic representation of the apparatus of the invention.

The present invention will now be described with reference to FIG. 1, where (1) indicates the gas to be purified and (2) is a fan device transporting the gas (1) into the washing chamber (3), in which the gas is washed with a washing solution (4) provided from the collection tank (12) via a pump (6), and in which the gas (1) and the washing solution (4) descend co-currently through a limestone bed (5) to exit together at the top of the tank (12), and where the washed gas (11) is transported along the surface (10) of the washing water (20) in the collection tank (12) and exhausted through a chimney (13), and the used washing solution (21) is collected in the tank (12) together with the washing water (20), in which tank an oxidizing solution (7) and a chloride solution (8) is added; the excess water (9) is led to a water purification plant (14) in which a sulphide solution (15) is added, whereafter the water and the precipitated solid particles are separated in (16), where the sludge (17) is removed, and a part of the purified chloride water is fed to a recipient (18) and the remaining part (19) is then returned to the tank (12).

The present invention will be further described by the following examples.

EXAMPLE 1

In this example the redox potensials at which $SO_2$ is oxidized to sulpuric acid at different pH values was established.

This was done by adding a fixed amount of $NaHSO_3$ to sea water with a known pH value. Subsequently, small amounts of potassium iodide (KJ)/starch solution were added as an indicator for titration of $NaHSO_3$ using NaClO. When a blue colour developed, the $SO_3^-$ was consumed, and the redox and pH were recorded. This is a common iodine titration of chlorine/hypochlorit in water.

TABLE 1

Results of oxidation of $SO_2$ with NaClO

| pH | Redox value (mV) at which a blue colour was noted |
|---|---|
| 3.0 | 340 |
| 4.4 | 322 |
| | In accordance with the invention |
| 6.0 | 290 |
| | In accordance with the invention |
| 7.0 | 265 |
| 8.0 | 235 |
| 9.5 | 175 |

Comments

The results show that at redox values >ca. 300 mV at pH values in the range 3–6 mercury cannot be reduced by the $SO_2$.

EXAMPLE 2

A flue gas from a smelter furnace was drawn through a very efficient venturi scrubber, consisting of a laboratory water jet vacuum pump.

The washing water was pumped from a collection tank for washing water by means of a pressure pump feeding the water jet pump, and hence sucking the flue gas therethrough.

In this manner a very efficient mixing of the gas and the washing water was obtained, and the progress could be observed continuously by taking gas samples both before and after the gas washer, as well as water samples from the washing water. Samples were taken at the beginning and the end of a gas measurement.

Caustic (NaOH) was used to keep pH at a constant value.

TABLE 2

Results, mass balance

| | Analyses of the wash water μg Hg/l | | | | Total amount μg Hg. Absorbed in the washing water as: | |
|---|---|---|---|---|---|---|
| Test | Start | Stop | pH | Redox | $Hg^{++}$ | $Hg^+$ |
| 1 | 9.7 | 15 | 8.0 | 750 | 121 | 0 |
| 2 | 4.6 | 33 | 6.3 | 800 | 631 | 0 |
| 3 | 54 | 48 | 5.9 | 600 | 0 | 135 |
| 4 | 55 | 38 | 5.9 | 550–600 | 0 | 435 |
| 5 | 0 | 0,24 | 5.2 | 200–300 | 5 | 12 |

Comments

Test 1 and 2 show that all of the mercury was absorbed in the sea water as $Hg^{++}$.

The tests 3 and 4 show that Hg is precipitated as $Hg^+$ at redox values $\leq 600$ mV. This is indicated by the fact that the contents of Hg in the washing water declined during the test period.

Test 5 was carried out with pure sea water without addition of caustic or hypochlorite. $Hg^{++}$ in the water might be due to dissolution of previously precipitated $Hg^+$ salts.

Conclusion

In order to absorb all of the mercury in sea water as $Hg^{++}$ ions, the redox potential in the sea water must be >600 mV, at pH values in the range 6–8.

EXAMPLE 3

The flue gas from a smelter furnace was burned in a steam boiler to: $CO_2$, $SO_2/SO_3$ and $H_2O$. This gas contained 100–200 μg of $Hg/Nm^3$.

A gas purification plant which could purify up to 1000 $m^3$ gas/hour was used, and connected to a water purification plant as shown in FIG. 1.

Gas washing liquid: sea water
pH kept constant by means of limestone
Redox adjusted with NaClO, 15% commercial product
Recirculation of the washing water in respect to gas:
  1 l/$m^3$ gas
Addition of sea water: 60 l/hour.

TABLE 3

Gas purification results

| | Gas rate | Gas washing liquid | | Mercury contents in gas | | |
|---|---|---|---|---|---|---|
| No. | $Nm^3$/t | pH | Redox | Inlet | Purified gas | % purification ($\mu g/Nm^3$) |
| 1 | 350 | 5.8 | 700–850 | 176 | 13 | 93 |
| 2 | 350 | 6.2 | 700–850 | 168 | 11 | 93 |
| 3 | 350 | 5.9 | 600–800 | 162 | 11 | 93 |
| 4 | 850 | 5.7 | 700–800 | 164 | 16 | 90 |

Comments

No carbonates were formed, and the operation was very stable, due to the stable pH value of the gas washing water.

In test 4, redox was varied between 600 and 800 mV to simulate variation in process conditions. This did not have any effect on the level of purification.

With a gas rate of 850 Nm$^3$/h the linear gas velocity through the limestone bed was calculated at 7 m/sec, and at a recidence time of only 0.055 seconds.

Even this was sufficient for purification, which shows that the instant process is very rapid and effective.

A mass balance of the distribution of the mercury in test 2, between the gas phase and the gas washing water, showed that close to 100% of the absorbed mercury was absorbed as Hg$^{++}$ in the gas washing water.

The mercury was removed from the gas washing water by a common sulfide precipitation in a subsequent water purification plant. This was effected by adding 1.3 l/m$^3$ washing water from a solution of sodium sulfide (10 g/l, Na$_2$S) to the gas washing water in a stirred tank until the redox potential of the water was between −50 and −100 mV. Subsequently, the water and sludge were separated in a filter press. The filtrate contained <1 μg Hg/l. The formed, and other particles, functioned so well as a filter aid that the filtering resistance in the filter press was <0.5 bar.

EXAMPLE 4

This example is a summary of results, showing the efficiency of the instant invention compared to venturi gas washers with and without a droplet catcher.

TABLE 4

Results

| | | | | μg Hg/Nm$^3$ | |
| --- | --- | --- | --- | --- | --- |
| | | | | Purified | Condensed |
| | | Gas washing water | | | |
| Gas washer type | pH | Redox | Raw gas | gas | water[+)] |
| Small venturi[1] without drop catcher | 5.8 | 600 | 74 | 90 | 63 |
| Big venturi[2] with drop catcher | 5.0 | 690 | 154 | 52 | 1.1 |
| | 4.4 | 790 | 127 | 75 | 0.8 |
| Present[3] invention | 5.8 | 830 | 167 | 15 | 0.6 |
| | 5.7 | 640 | 165 | 16 | 0.9 |

Comments

1): The venturi washer referred to in example 2, without drop catcher. Very efficient mixing of gas and washing liquid.

2): Large venturi washer with a capacity of treating 1000 m$^3$/hour, with drop catcher. Inferior mixing of gas and washing liquid.

3): Gas washer in accordance with the invention with a limestone bed with a capacity of 850 m$^3$/hour. Very efficient mixing of gas and washing liquid.

Condensed water*) was collected in an extra bottle before the gas analysis of the purified gas. The mercury contents of the condensed water was calculated to give the stated contribution of Hg in the gas, if the condensed water had been introduced into the purified gas without a droplet catcher.

Further, it can be observed that the effect of a droplet catcher in 2) and the effect in accordance with the invention 3), where the amount of condensed water in the gas is so small that the purified gas is not polluted.

It can also be seen that the total mercury purification efficiency of the venturi washer 2) with the droplet catcher is substantially lower than the purification efficiency in accordance with the invention 3), when both were tested on the same gas from a smelter.

What is claimed is:

1. A process for the removal of gaseous mercury and gaseous sulfur dioxide out of a flue gas, comprising:

passing the flue gas into a scrubbing vessel;

passing an aqueous washing liquor, which contains an oxidizing agent in such an amount that the red/ox potential of the washing liquor is between 600 and 800 mVolts (SCE) and which also contains chloride ions in an amount of at least 1 gram/liter, into the scrubbing vessel so that the flue gas and the washing liquor are contacted cocurrently, and the gaseous mercury is sorbed into the aqueous washing liquor and converted into mercury (II) chloride species and the gaseous sulfur dioxide is sorbed into the aqueous washing liquor and converted into sulfuric acid;

subsequently, passing the flue gas and the resulting, mercury (II) chloride species and sulfuric acid-containing, aqueous washing liquor through a bed of calcium carbonate solids, within said scrubbing vessel, so that the sulfuric acid reacts with the calcium carbonate to produce calcium sulfate, which is washed off the surfaces of the calcium carbonate solids into the aqueous washing liquor, thereby resulting in an aqueous washing liquor containing mercury (II) chloride species and calcium sulfate; a bed of calcium carbonate solids with exposed calcium carbonate surfaces, and a cleaned flue gas, and discharging the cleaned flue gas out of the scrubbing vessel, and collecting the mercury (II) chloride species and calcium sulfate-containing, aqueous washing liquor in a collection sump, which is located at the bottom of the scrubbing vessel.

2. The process of claim 1, wherein said oxidizing agent is chlorine, which has been generated from the chloride ions in the aqueous washing liquor by passing an electric current through the aqueous washing liquor.

3. The process of claim 1, wherein the said oxidizing agent is sodium hypochlorite.

4. The process of claim 1, wherein the aqueous washing liquor contains chloride ions in an amount of 30 to 40 grams/liter.

* * * * *